United States Patent
Davis et al.

(10) Patent No.: US 6,377,374 B1
(45) Date of Patent: Apr. 23, 2002

(54) METHOD APPARATUS AND COMPUTER PROGRAM PRODUCT FOR OPTICAL NETWORK RESTORATION

(75) Inventors: Gary B. Davis, Rowlett; Reddy Urimindi; Andrew N. Robinson, both of Plano, all of TX (US); Rainer Iraschko, Sunnyville, CA (US); George Georgiou, Garland, TX (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 09/441,527

(22) Filed: Nov. 16, 1999

Related U.S. Application Data (62) Division of application No. 09/026,641, filed on Feb. 20, 1998, now Pat. No. 6,111,672.

(51) Int. Cl.[7] .............................. H04J 14/02
(52) U.S. Cl. .................. 359/128; 359/110; 359/161
(58) Field of Search .................. 359/110, 117, 359/128, 161, 139; 370/217–220, 225, 228

(56) References Cited

U.S. PATENT DOCUMENTS

| | | | | |
|---|---|---|---|---|
| 5,182,744 A | * | 1/1993 | Askew et al. ................. 370/16 |
| 5,457,556 A | * | 10/1995 | Shiragaki ..................... 359/117 |
| 5,778,184 A | * | 7/1998 | Brownmiller et al. ....... 709/224 |
| 5,805,320 A | * | 9/1998 | Kuroyanagi et al. ........ 359/117 |
| 5,870,032 A | * | 2/1999 | Eslambolchi ............... 340/827 |
| 5,872,912 A | * | 2/1999 | Brownmiller et al. ........ 714/47 |
| 5,884,017 A | * | 3/1999 | Fee ................................. 714/4 |

* cited by examiner

Primary Examiner—Leslie Pascal (57) ABSTRACT

An method, apparatus, and computer program product for restoring a failed system in an optical mesh network. A system includes a first light termination element (LTE) and a second LTE. A first node in the network includes an optical switching unit (OSU) coupled to the first (LTE) of the system. A second node in the network includes a second OSU coupled to the second (LTE) of the system. The first node is coupled to the second node by a path. Optical data traffic can be transmitted between the first node and the second node via the path. Upon detection of a failure of the system, the first OSU and second OSU are notified of the failure. A primary role is assigned to one of the first and second OSUs, and a secondary role is assigned to the other one of the first and second OSUs. A primary restoration plan is determined by the primary OSU. Information identifying the primary restoration plan is sent from the primary OSU for effecting the restoration path to restore the system.

8 Claims, 11 Drawing Sheets

Action Table for Node A — 202a

| Failed Span | Role | Isolated Failure | Restoration Plan |
|---|---|---|---|
| AB | Primary | Link 122 | Plan 1 |
| | | Link 124 | Plan 2 |
| | | Link 126 | Plan 3 |
| | | Line Element 138 | Plan 4 |
| | | ⋮ | ⋮ |
| | | Default | Plan 2 |
| AF | Secondary | Link 142 | Plan 1 |
| | | Link 144 | Plan 2 |
| | | Link 146 | Plan 3 |
| | | Line Element 138 | Plan 4 |
| | | ⋮ | ⋮ |
| | | Default | Plan 3 |
| AH | Secondary | ⋮ | ⋮ |

FIG. 2A

Action Table for Node B — 202b

| Failed Span | Role | Isolated Failure | Restoration Plan |
|---|---|---|---|
| AB | Secondary | Link 122 | Plan 1 |
| | | Link 124 | Plan 2 |
| | | Link 126 | Plan 3 |
| | | Line Element 138 | Plan 4 |
| | | ⋮ | ⋮ |
| | | Default | Plan 2 |
| BC | Primary | Link 152 | Plan 1 |
| | | Link 154 | Plan 2 |
| | | Link 156 | Plan 3 |
| | | Line Element 148 | Plan 4 |
| | | ⋮ | ⋮ |
| | | Default | Plan 3 |
| BE | Secondary | ⋮ | ⋮ |

METHOD APPARATUS AND COMPUTER PROGRAM PRODUCT FOR OPTICAL NETWORK RESTORATION

This application is a divisional of U.S. patent application Ser. No. 09/026,641 now U.S. Pat. No. 6,111,672, filed Feb. 20, 1998.

FIELD OF THE INVENTION

The present invention relates generally to the reliability and restoration of optical transmission systems.

BACKGROUND OF THE INVENTION

1. Field of the Invention

The present invention relates to communications networks. More specifically, the present invention relates to an apparatus and method for controlling restorative switching of an optical network.

2. Related Art

A service disruption in a communications network may be caused by a number of problems including inoperable communications links, cable cuts, or failure of equipment within a system. In the event of a failure the traffic must be restored temporarily until the failure is repaired. Two restoration approaches are network restoration switching and line protect switching. The restoration approach which is used varies depending on the failure.

Network Restoration Switching: When a fiber cut or other major failure disables a communications system, network restorative switching (NRS) may be employed to reroute the traffic through the network via a restoration path. The restoration path carries traffic between the two end nodes until repairs of a path normally supporting the system are complete.

A mesh topology is a preferred topology for a network using NRS. A properly equipped mesh network contains switching nodes that are connected to two or more adjacent nodes. In a mesh topology, a given signal may have many possible routes by which to traverse the network. Mesh networks allow for sophisticated actions to be taken in response to a failure. If there is a sudden failure of several links, or an entire span, neighboring switching nodes can perform distributed switching to divert the traffic around the failure. For this purpose, most of the spans in a mesh network are equipped with extra spare links that can be called upon for emergency traffic handling in response to a failure.

The manner in which a given network should switch to recover from any possible failure is presently the subject of considerable development in the communications field. One type of network restoration scheme locates a service disruption, identifies alternate routes, and then establishes such routes, in order that a service disruption will minimally affect a communication system user. Two types of control schemes for mesh restoration are a centralized scheme and a distributed pre-planned scheme.

In a centralized restoration scheme, a telecommunication network includes a central site capable of establishing alternate routes when a failure occurs. For an example of a centralized restoration scheme see U.S. Pat. No. 5,182,744 issued to J. Askew et al., incorporated in its entirely herein by reference.

In a distributed pre-planned restoration scheme, network connections are restored by intelligent switching nodes distributed throughout the network. For an example of a distributed pre-planned restoration scheme see U.S. Pat. No. 5,173,689 issued to T. Kusano, incorporated in its entirety herein by reference.

When a disruption occurs, the time to restore service using NRS depends upon a number of factors, such as (a) the time required to identify the locations of the service disruption; (b) the time required to determine alternative routes that avoid the service disruption; and (c) the time required to actually establish such routes. In selecting a new communications route, it is often desirable to select the most efficient alternate route, i.e., the one generally having the minimal distance and/or hop count.

Line Protect Switching: Another method of network restoration is line protect switching (LPS). In LPS, local light termination elements (LTE) reroute traffic from a "working" channel to a "spare" channel. LPS ensures resiliency to equipment failure by employing a spare channel, also referred to as the protect channel, that normally does not carry traffic but may be used as a back-up should a "working" channel fail. The spare channel can be rerouted along the same physical path as the working channel. Preferably, the spare channel is routed along a completely different physical path to minimize the chance that the spare channel experiences the same fate that disabled the working channel.

In order to reduce costs, LPS can employ the use of one spare channel for five working channels. Because fewer spare channels are available than working channels, LPS cannot restore an extensive failure, such as a cable cut. LPS is primarily aimed at restoring single channel failures and is implemented within the LTE, which is the local equipment that terminates the fiber optic cable. Since LPS is localized and simple, it is also very fast requiring only tens of milliseconds for restoring a failed communications system. LPS can quickly restore simple localized failures. In many applications, the LPS can switch traffic without causing any significant interruption to traffic. LPS is described in further detail in commonly-owned, co-pending U.S. patent application Ser. No. 08/672,808 entitled, "System and Method for Photonic Facility and Line Protection Switching," filed by John Fee on Jun. 28, 1996, incorporated in its entirety by reference herein.

Because telecommunications networks can include high capacity terrestrial and under water optical cables, the networks are susceptible to failures that disable a very large number of channels causing potential high volume of traffic loss and significant economic impact. There is a need for a fast, efficient, and reliable apparatus and method for restoring a network. Additionally, there is a need for an apparatus and method for restoring a network that takes advantages of the benefits of both LPS and NRS.

SUMMARY OF THE INVENTION

The present invention provides an apparatus and method for restoring systems of an optical network. Each node in the optical network includes an optical cross connect switch (OCCS) and an OCCS-controller. OCCS-controllers control the switching of respective OCCSs to perform NRS in response to a failure notification.

Within a first end node, an OCCS and an OCCS-controller make up a first optical switching unit (OSU). Within a second end node, an OCCS and an OCCS-controller make up a second OSU. One of the two OSUs is designated the primary OSU while the other is designated the secondary OSU. In the event NRS is needed, each OSU independently and in parallel determines a restoration plan for providing a restoration path between the first and second end nodes. The primary OSU sends a primary restoration plan to OSUs in other nodes of the optical mesh network for effecting the restoration path. If the secondary OSU does not receive information identifying the primary restoration plan from the primary OSU, then the secondary OSU sends a secondary restoration plan to the other OSUs in the other nodes of the optical mesh network for effecting the secondary restoration path. In the preferred embodiment, the primary restoration plan is the same as the secondary restoration plan. By having both the primary OSU and secondary OSU determine restoration plans at the same time, the speed in which, and the likelihood that, a restoration path will be established is increased.

The first and second end nodes each also includes an LTE which communicates with their respective OCCS-controllers. The LTEs can perform LPS to switch to a spare channel when a working channel fails. The OCCS-controllers can switch the OCCSs to perform NRS. In the preferred embodiment, if the LTEs are unable to restore a failure, then the LTEs transfer responsibility for restoration to their respective local OCCS-controllers.

A feature of the present invention is that a primary restoration plan and a secondary restoration plan for restoring a network are determined independently and in parallel.

Another feature of the present invention is that network restoration switching (NRS) coexists with line protect switching (LPS) without causing oscillations between the LPS and NRS.

An additional feature of the present invention is that each OCCS-controller at an end node performs restoration functions independently of other end nodes so that a failure of several systems does not increase the time to restore the first failed system.

A further feature of the present invention is that a restoration plan chosen can be dependent upon the location of a failure within a path supporting a system.

Still another feature of the present invention is that a default restoration plan can be chosen if the location of a failure is unable to be isolated within a predetermined amount of time.

Further feature and advantages of the invention, as well as the structure and operation of the invention, are described in detail below with reference to accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the relevant art to make and use the invention.

The present invention will now be described with reference to the accompanying drawings. In the drawings, like reference numbers indicate identical or functionally similar elements. Additionally, the left-most digit(s) of a reference number typically identifies the drawings in which the reference number first appears.

DETAILED DESCRIPTION OF THE PREFERRED EMBODIMENTS

Terminology

To more clearly delineate the present invention, an effort is made throughout the specification to adhere to the following term definitions as consistently as possible.

The term "node" refers to a physical location within a communications system that includes an optical cross connect switch (OCCS). The term "node" may refer to an "end node" or "intermediate node". The term "end node" refers to a "node" that includes at least one light termination element (LTE). Thus at an end node, an OCCS is co-located with at least one LTE.

The term "intermediate node" refers to a "node" that does not include an LTE.

The term "link" refers to a communications line between two adjacent "nodes". A "link" may be made up of multiple fibers wherein each fiber may contain multiple channels. A "link" may also include multiple line elements such as: optical modules for monitoring signal presence, optical regenerators for filtering and amplifying signals, and line regeneration equipment.

The term "light termination element" and the abbreviation "LTE" refers to the local equipment within a node that terminates a fiber optic cable. A function of an "LTE" includes converting data signals from an electrical domain to an optical domain (and vice versa). Additionally, an "LTE" can detect a failure in a system of which the "LTE" is included. Following detection of a failure, an "LTE" can perform line protect switching (LPS) in an attempt to restore a system.

The term "LTE system" or "system" is defined as a pair of "LTEs" that communicate with one another via any one of a number of paths.

The term "path" refers to a specific route between two "end nodes". A "path" may be made up of any number of "links". A "path" provides a physical route between two "LTEs" of a "system". A "path" may be described of as supporting a "system".

The term "optical switching unit" and the abbreviation "OSU" refers to an OCCS and an OCCS-controller together.

The term "optical cross connect switch" and the abbreviation "OCCS" refers to a device that can switch optical paths between a plurality of optical ports. Any one of the plurality of optical ports can be internally optically coupled to any other ports within an OCCS.

The term "OCCS-controller" refers to a device that sends and receives status and switch commands to and from an "OCCS". Examples of switch commands include port coupling and decoupling commands. A port coupling command causes an "OCCS" to internally couple a first port of the "OCCS" to a second port of the "OCCS". An "OCCS-controller" controls an "OCCS" to perform necessary switching for effecting a restoration "path". The port connections of an OCCS may be referred to as a connection map.

Example Environment

Figure 1A:
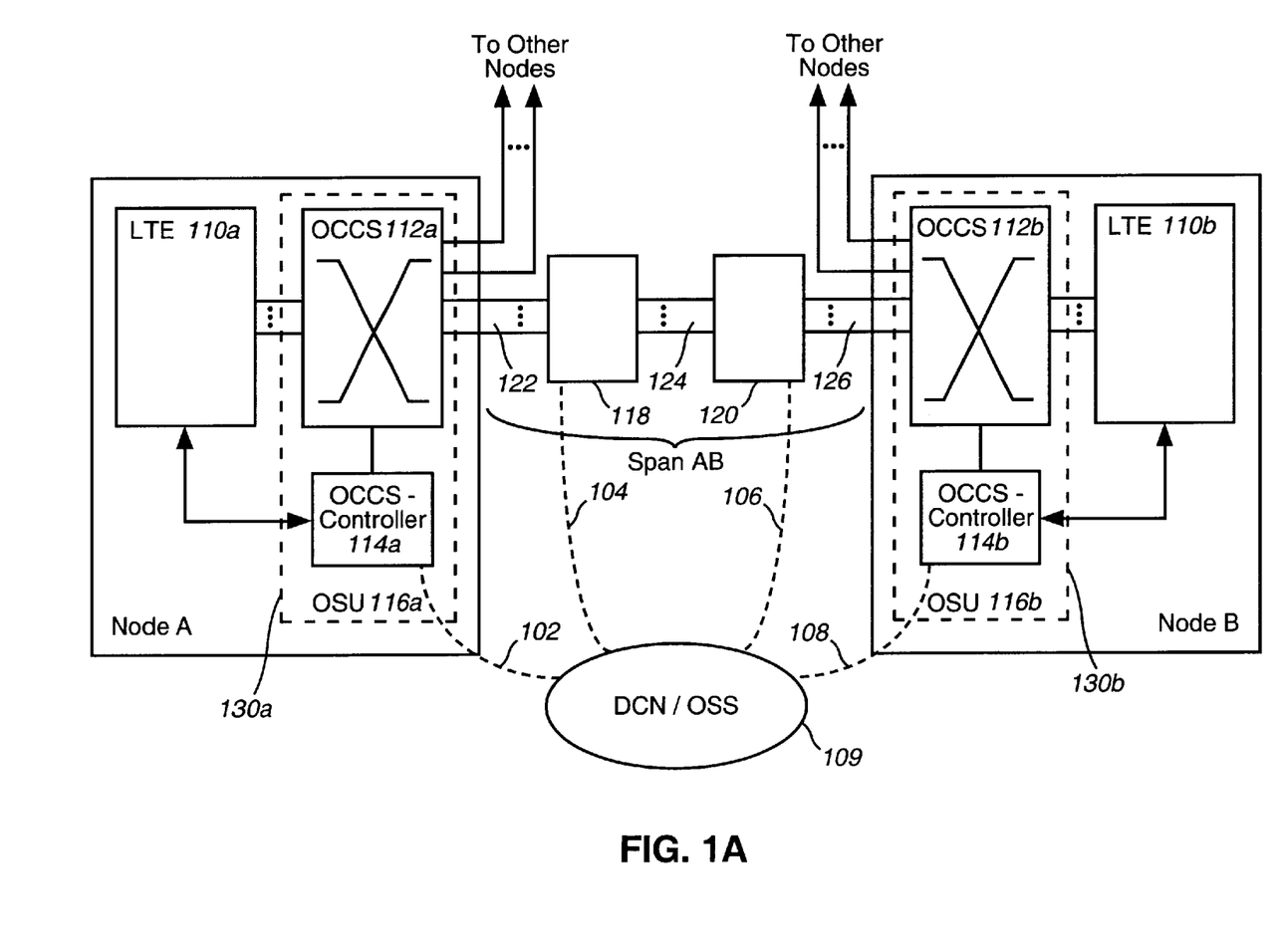
FIG. 1A illustrates a portion of communications network, according to the present invention.

FIG. 1A is a diagram of a portion of an optical network according to the present invention. Nodes A, B, C, D can be part of an overall local, national, or global communications network. Each node A, B, C, D is connected to at least one other node, such that a given signal may have other possible routes by which to traverse the network. The optical communications network of the present invention may be configured to have any topology including but not limited to mesh, ring, and point-to-point. In the preferred embodiment, the network has a mesh topology.

Because end node D consists of substantially the same elements as end node A, end node D need not be described in detail. In an example environment, end node A includes LTE 110a, OCCS 112a, and OCCS-controller 114a. It is not intended that the invention be limited to application of this example environment. More specifically, the exact location of elements of the present invention, such as the locations of OCCS-controller 114a and OCCS 112a relative to a node or link, should not limit the present invention. Optical switching unit (OSU) 130a, includes OCCS-controller 114a and OCCS 112a. In one embodiment OCCS 112a and OCCS-controller 114a form one integral unit. In another embodiment, OCCS 112a and OCCS-controller 114a are two separate units coupled together such that OCCS-controller 114a can transmit and receive data from OCCS 112a. OCCS-controller 114a controls the switching of OCCS 112a.

System A-D includes light termination element (LTE) 110a and LTE 110d. Optical data traffic can be conducted between end nodes A and D via path A-B-C-D. Path A-B-C-D includes optical links AB, BC, and CD. Path A-B-C-D can be thought of as supporting system A-D.

LTE 110a is the local equipment that terminates a fiber optic cable. A function of LTE 110a includes converting data signals from an electrical domain to an optical domain (and vice versa). Additionally, LTE 110a detects failures in the systems of which LTE 110a is included. For example, LTE 110a detects when a failure occurs in system A-D. Following detection of a failure, LTE 110a can perform LPS in an attempt to restore system A-D.

Nodes and line elements (such as optical modules for monitoring signal presence, optical regenerators for filtering and amplifying signals, and line regeneration equipment) of mesh network 100 are coupled to a separate, off-band Digital Communications Network (DCN) and/or an Operation System Support (OSS) 109. The DCN is an ultra-reliable data network which is provided for communicating status signaling messages between nodes and line elements regarding system operation, failures, etc. In general, the DCN can transport status messages in any type of network protocol including Frame Relay, ATM, X.25, TCP/IP, and/or B-ISDN protocols. The OSS is a centralized network manager which oversees global network operations including network restoration management. As shown in FIG. 1A, nodes A, B, C, and D are coupled to the DCN/OSS 109 through control links 102, 104, 106, and 108. The abbreviation "OSS/DCN 109" used throughout this specification typically represents communications with the OSS via the DCN.

Example Topology

Figure 1B:
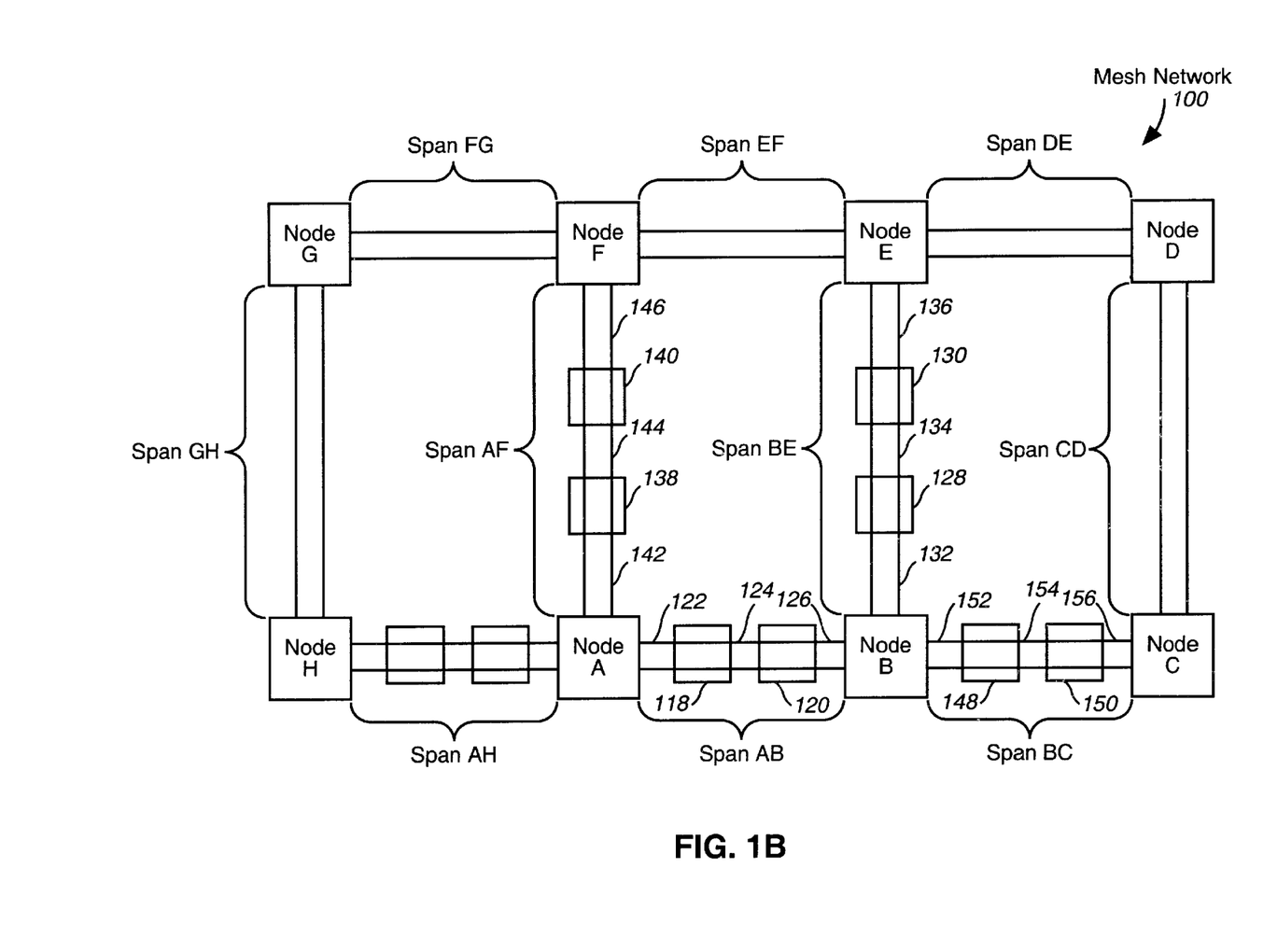
FIG. 1B illustrates an example topology of a communications network, according to the present invention.

FIG. 1B shows an example topology of an optical mesh network 100 including a plurality of nodes and a plurality of links coupled between the plurality of nodes for carrying optical data traffic. Nodes E, F, G, and H, are similar to nodes A, B, C, and D in that each node includes an OCCS, an OCCS-controller. Depending on whether the particular node contains an LTE, each node E through H is either an end node or an intermediate node.

Optical Network Restoration

Figure 2A:
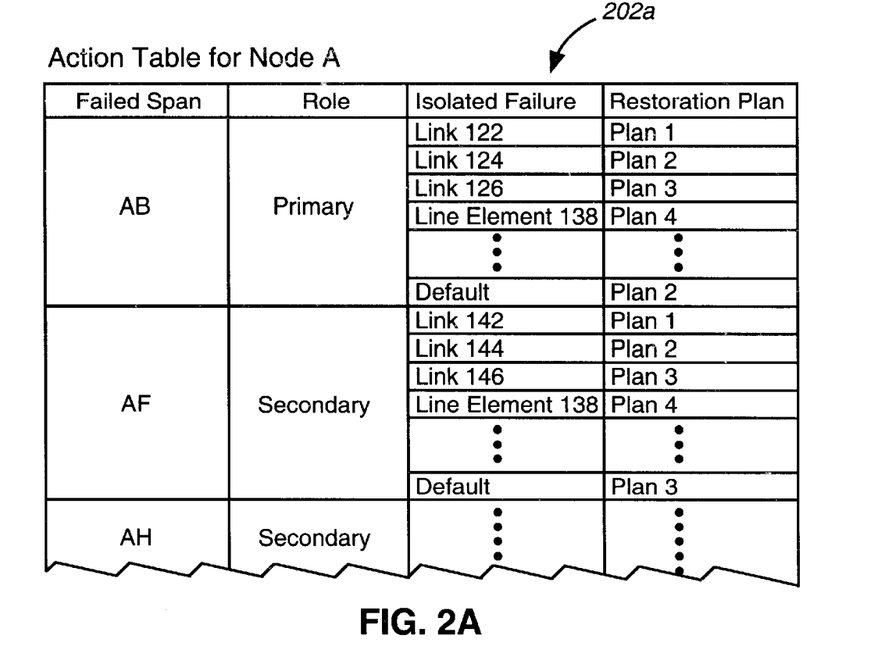
FIGS. 2A and 2B are restoration look-up tables used in performing restoration switching, according to an embodiment of the present invention.
Figure 2B:
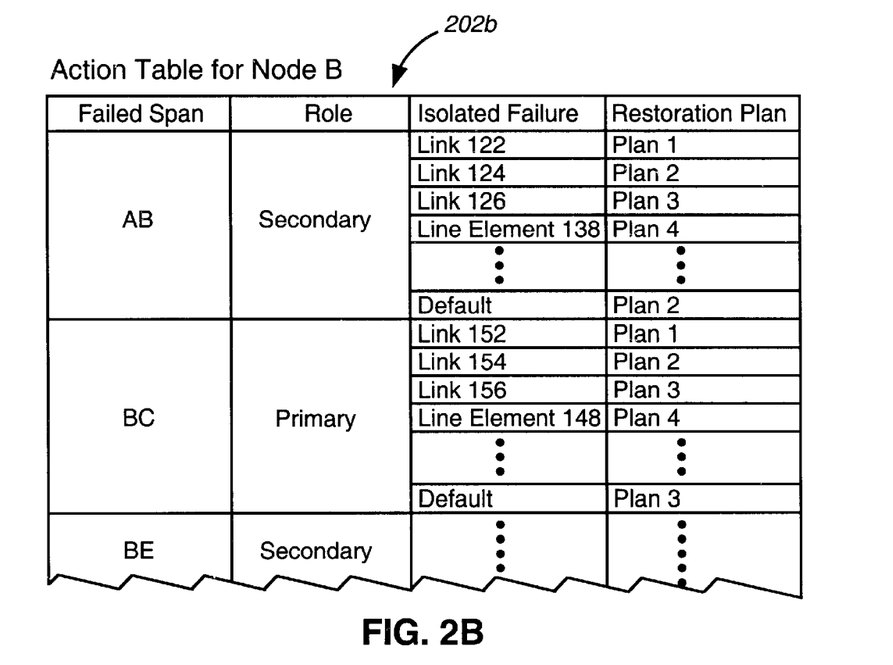

OCCS-controllers 114a, 114d communicate with LTEs 110a, 110d, respectively, to receive notification of a failure in system A-D. Restoration look-up tables are used by the OCCS-controllers of network 100 to switch the OCCSs to effect a restoration path in the event of a system failure. FIG. 2 shows an example of such a restoration table. The restoration tables are used by the OCCS-controllers of network 100 to switch the OCCSs to effect a restoration path in the event of a failure. Each OCCS-controller in network 100 includes such a restoration table for each of the systems of the network. Restoration look-up table 202 corresponds to system A-D. Similar restoration tables exist for other systems in network 100. For example, if node E is an end node (i.e., includes an LTE) and network 100 includes system A-D, system A-E and system D-E, then similar look-up tables exist for system A-E and system D-E.

Restoration Table

The first column 204 of restoration look-up table 202 defines the system for which the table corresponds. The second column 206 defines which of the end nodes of the system contains the primary OCCS-controller and which contains the secondary OCCS-controller. The third column 208 identifies which link has failed, for use when the failure has been isolated. For each link failure within a system, table 202 may contain multiple restoration plans. The fourth column 210, shows for example, that for each link failure one of three plans may be chosen. Each plan corresponds to a different restoration path. The last column 212 of restoration look-up table 202 identifies what connections must be made within each OCCS in the network to effect a restoration path associated with the particular restoration plan. The OCCSs in network 100 needing to be switched depends on which plan is chosen. Of course, not every OCCS in network 100 is involved in every restoration plan.

Assume optical data is to be sent from end node A to end node D. When a failure occurs in system A-D, LTEs 110a, 110d attempt to restore communications using LPS. If LPS does not successfully restore communications, then NRS can be used to configure a restoration path.

Assume system A-D normally sends data between end node A and end node D via a path A-B-C-D consisting of links AB, BC, and CD. If a fiber cut occurs in link BC, system A-D can be restored using a few different restoration paths. For example, system A-D can be restored by a restoration path A-B-F-G-C-D including links AB, BF, FG, GC, and CD. An alternative restoration path is A-E-F-G-H-D including links AE, EF, FG, GH, and HD. Thus plan 1 can correspond to restoration path A-B-F-G-C-D and plan 2 can correspond to restoration path A-E-F-G-H-D. Depending on which restoration path is used, the OCCSs at the nodes within that path must switch to effect the restoration path. Thus, for each plan an OCCS connection map exists for each of the OCCSs involved in the plan. The connection maps are used by the OCCS-controllers to switch the OCCSs to effect a restoration path. Further details of restoration look-up table 202 are described below, with respect to FIGS. 4A–4D. Below is a description of how a restoration path is determined and established, according to the present invention.

Figure 3:
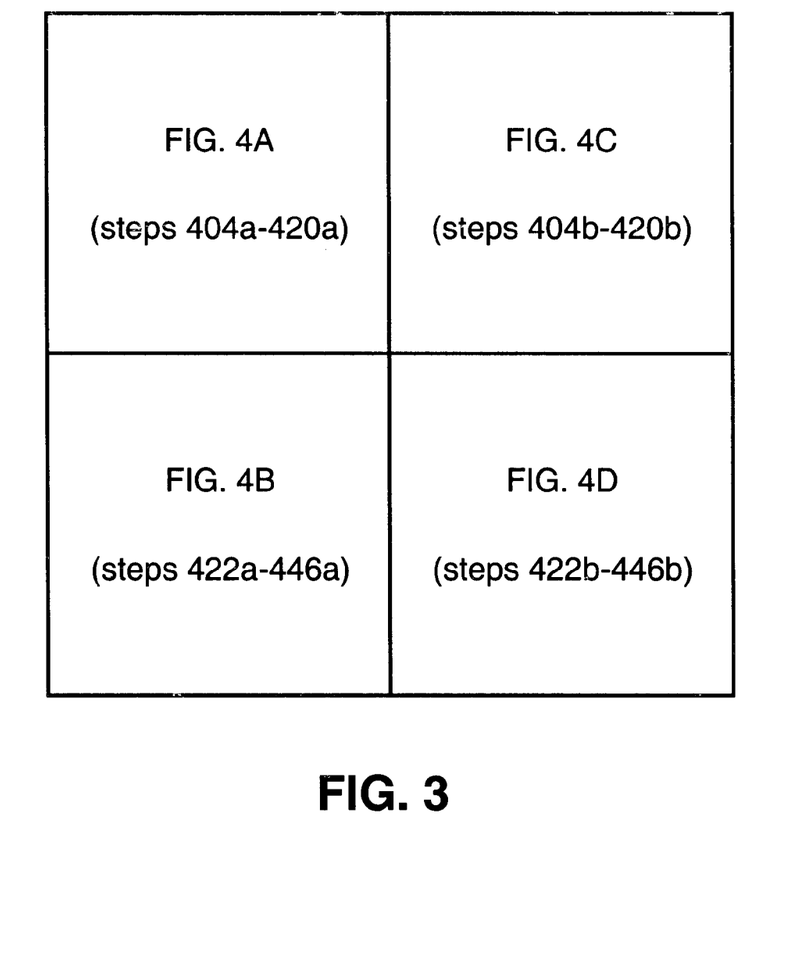
FIG. 3 shows how FIGS. 4A–4D should be viewed.

FIG. 3 shows how FIGS. 4A–4D should be viewed. FIGS. 4A–4D together are a control flow diagram representing operation of the communications apparatus according to the present invention. In this flow diagram, the following conventions are employed: a rounded box indicates a step in which a process starts or stops, a diamond-shaped box indicates a decision step that results in a branch, and a rectangular box indicates a step in which some action transpires.

Figure 4A:
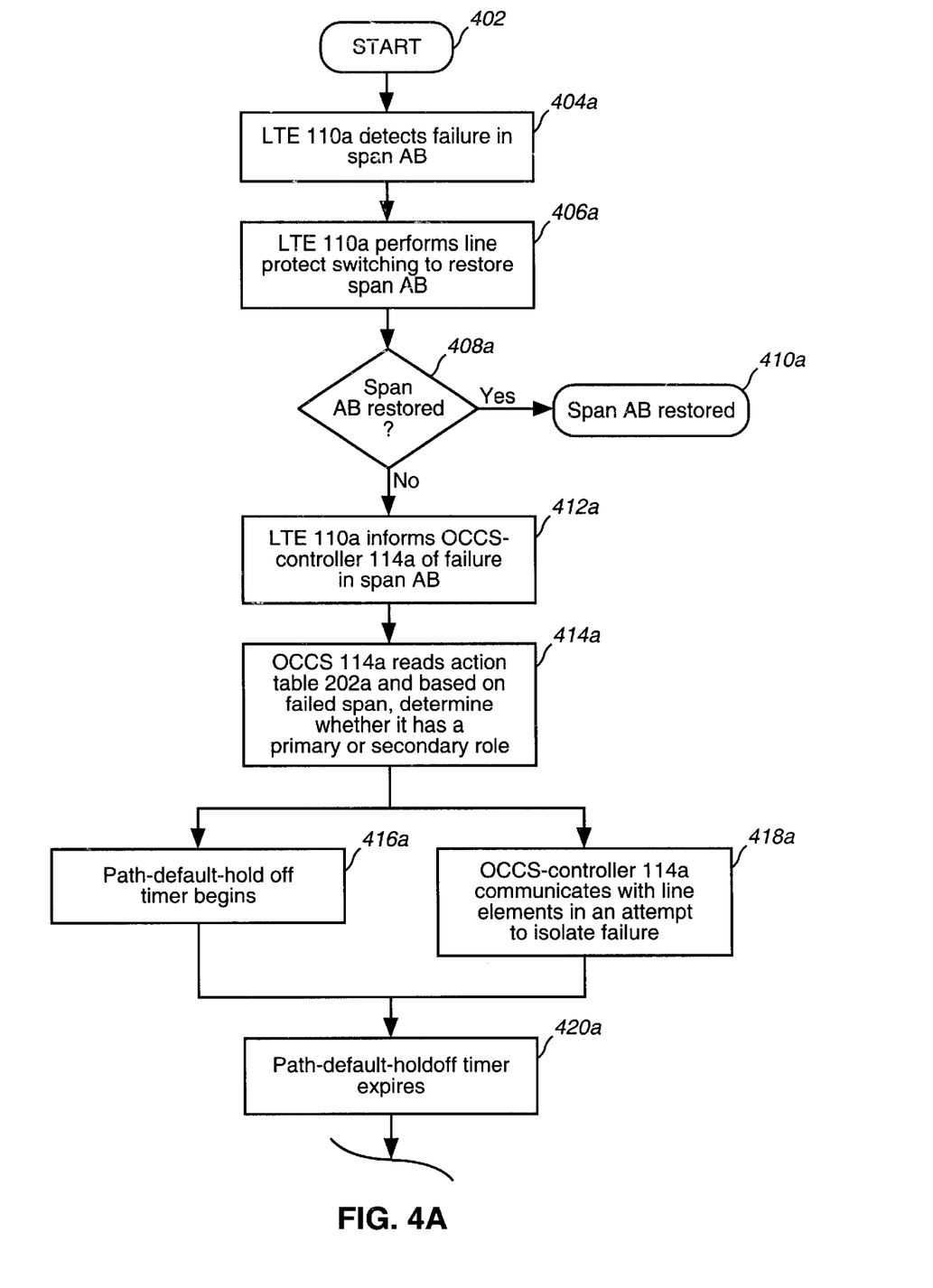
FIGS. 4A, 4B, 4C, and 4D illustrate a control flow diagram representing operation of the communications system according to the present invention.
Figure 4B:
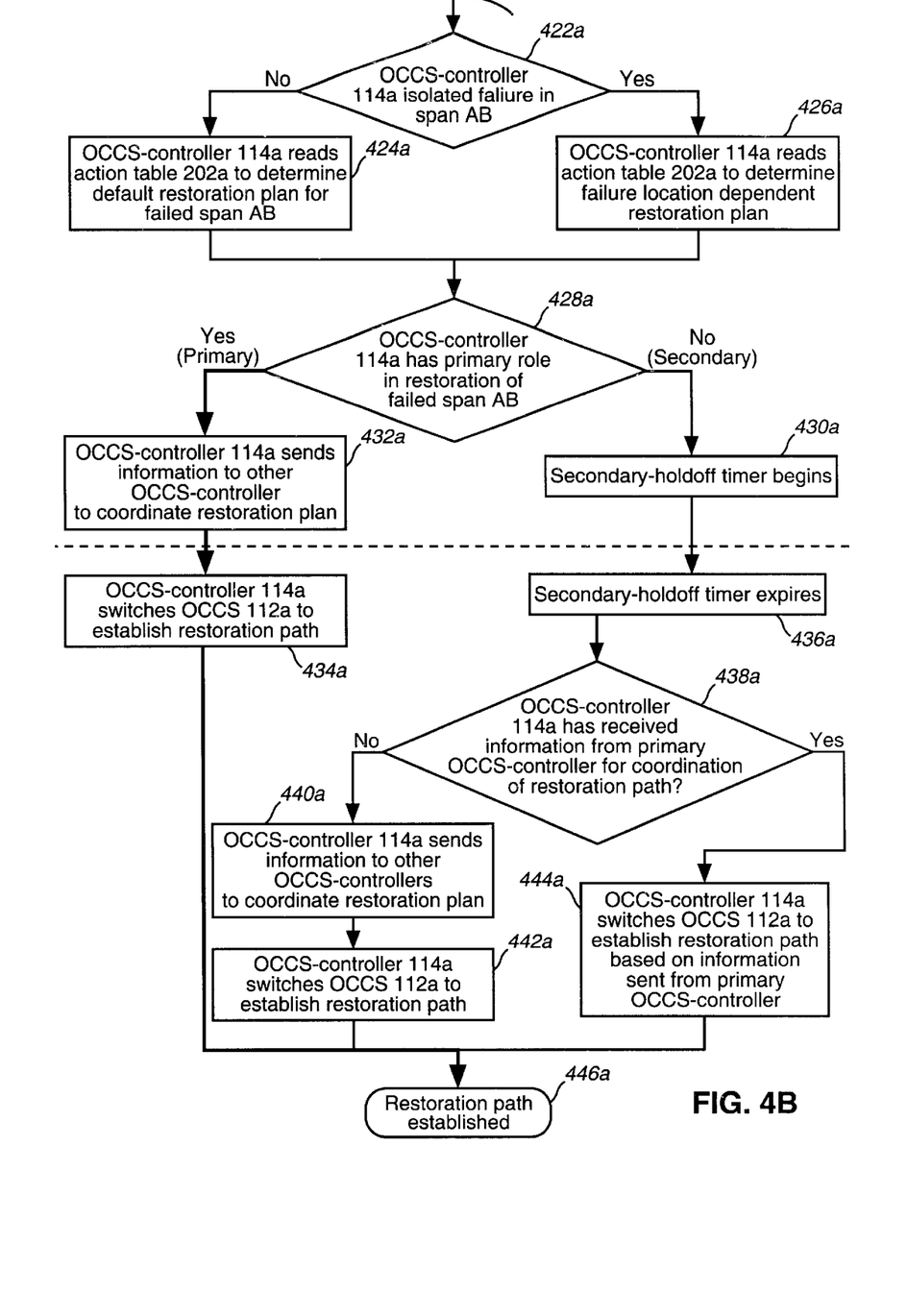
Figure 4C:
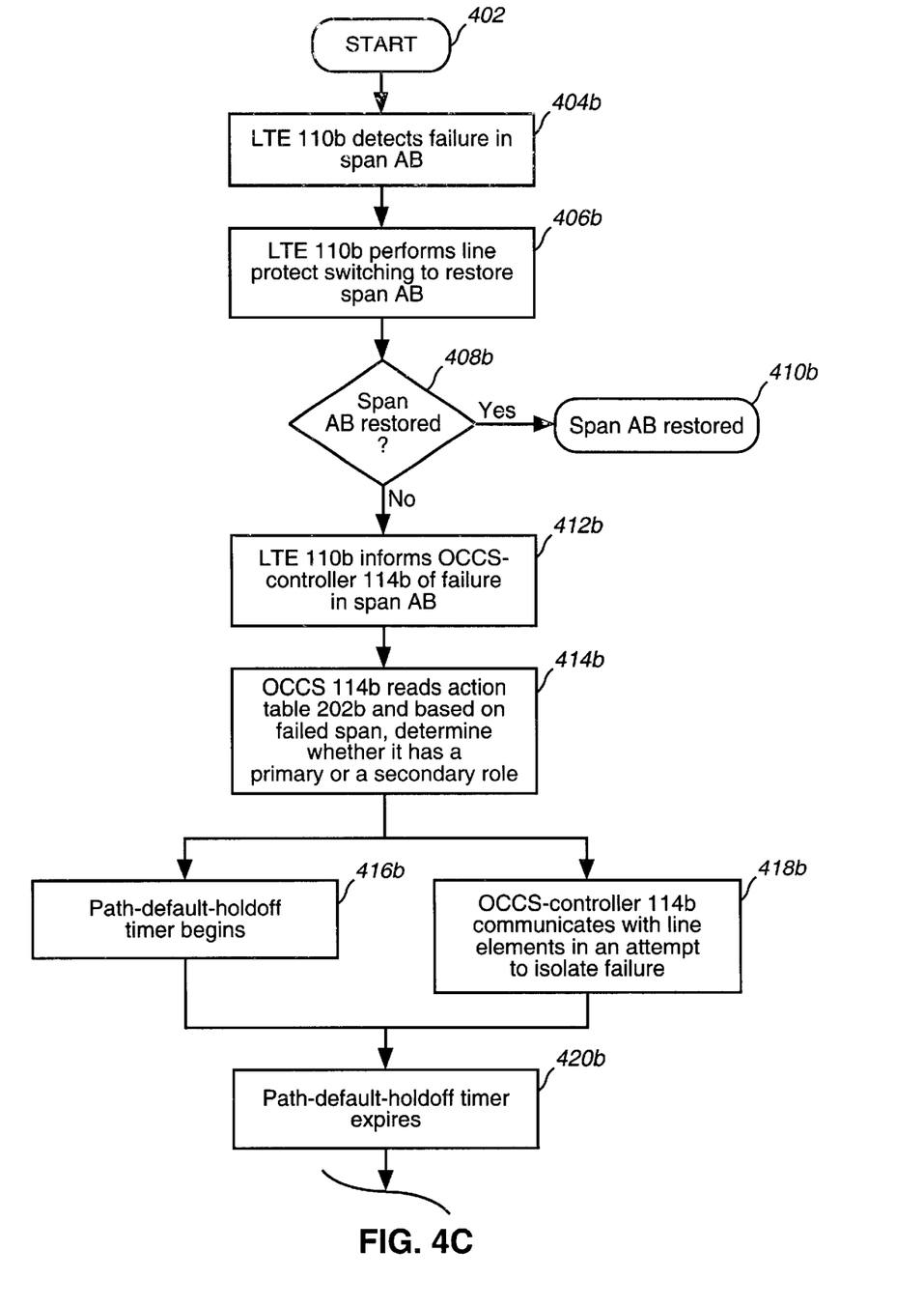
Figure 4D:
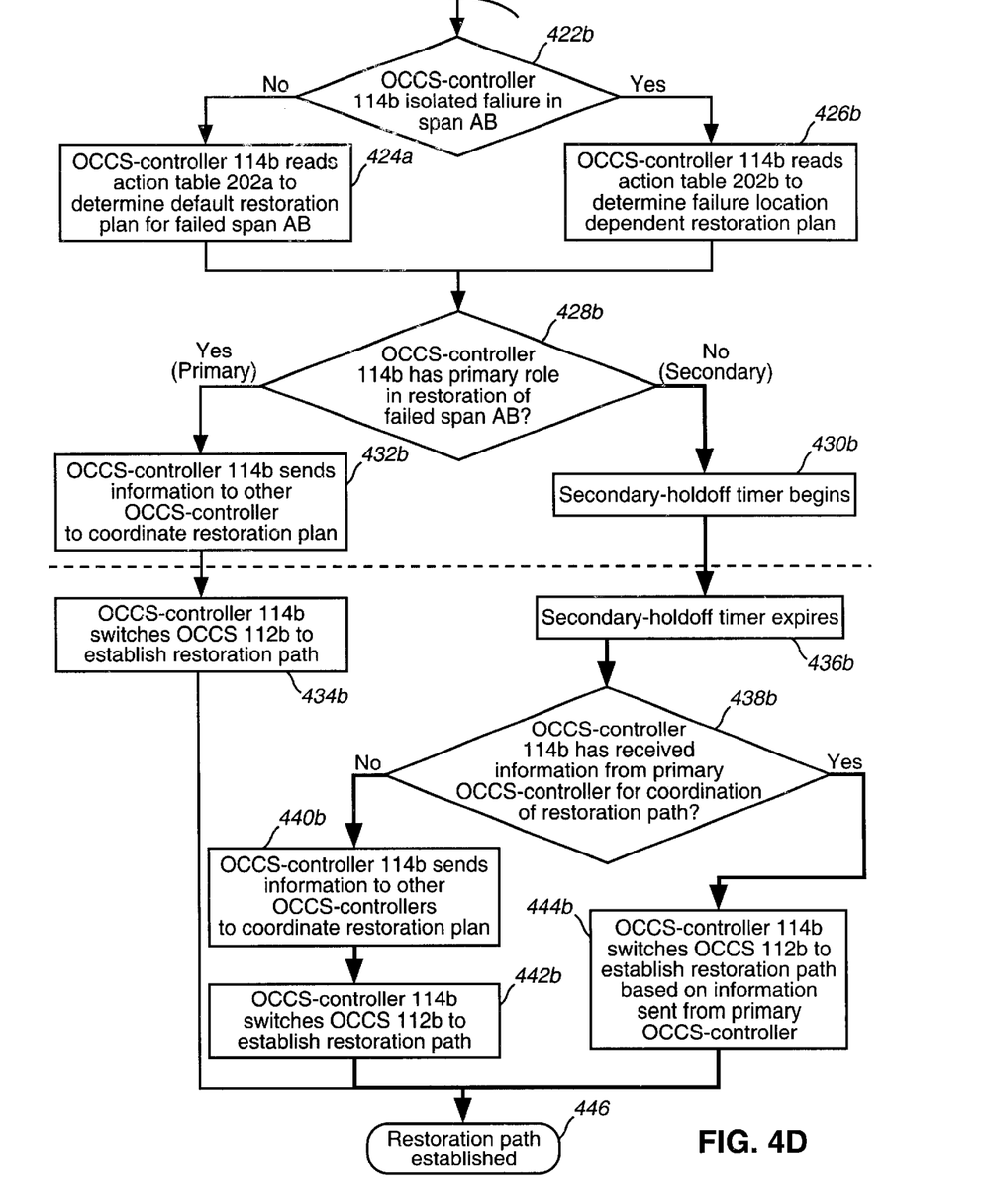
Figure 5A:
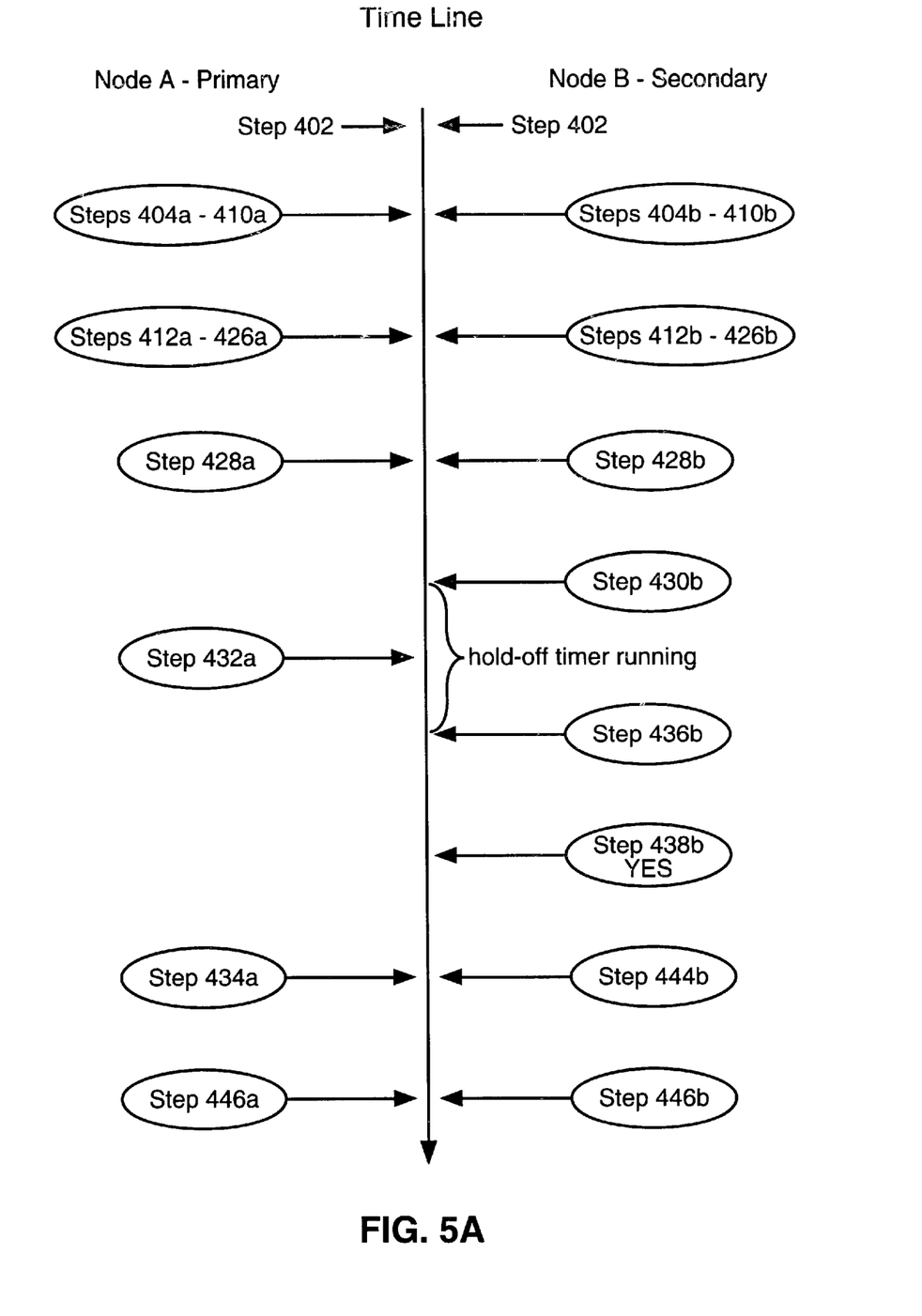
FIGS. 5A and 5B illustrates a time line showing steps of the control flow diagram in FIGS. 4A–4D occurring in parallel in primary and secondary nodes according to the present invention.
Figure 5B:
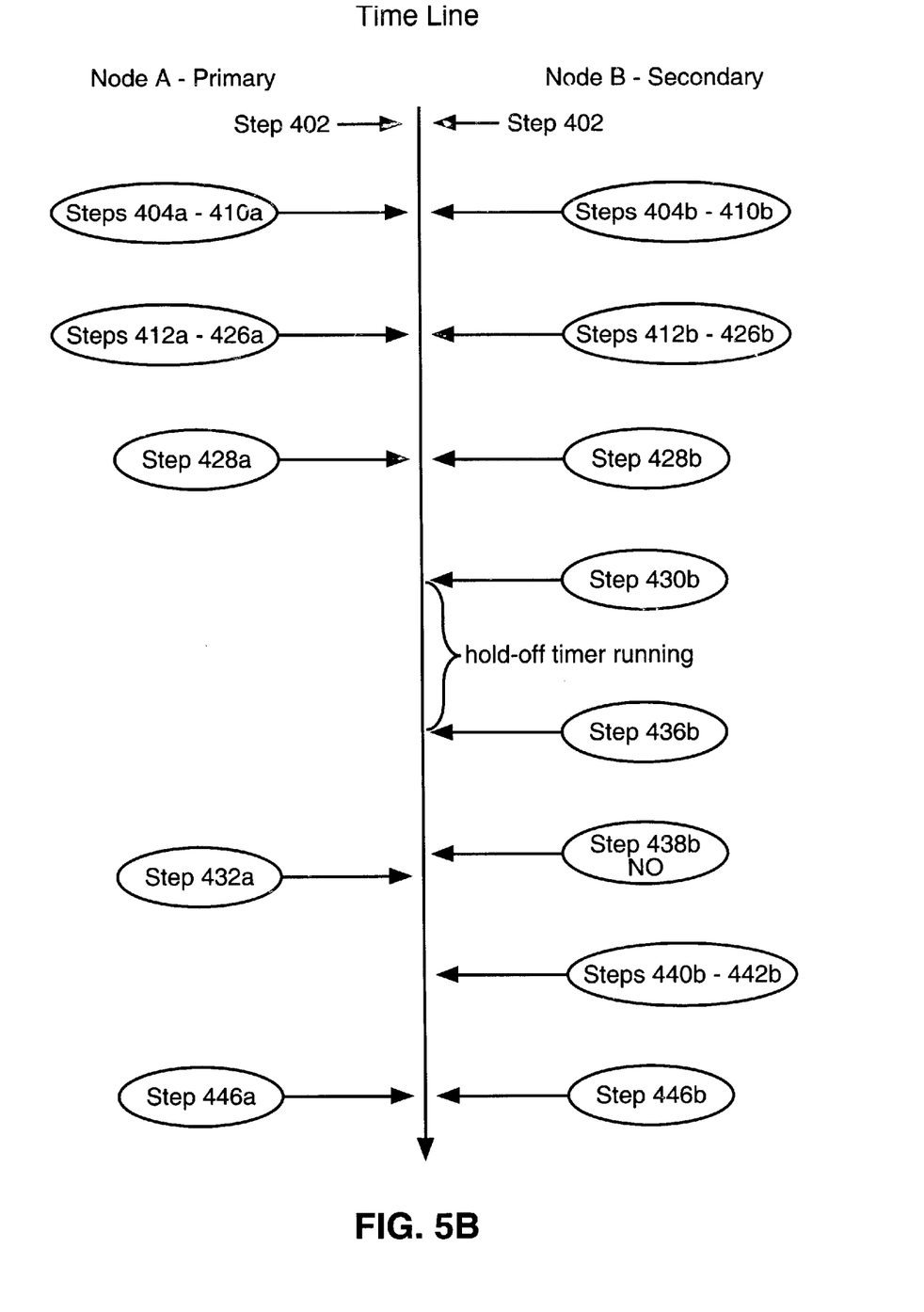

In FIGS. 4A–4D, control begins at step 402 and immediately continues to step 404a and 404d. Steps 404a–446a, in FIGS. 4A and 4B, represent steps which are associated with end node A. Steps 404d–446d, in FIGS. 4C and 4D, represent steps which are associated with end node D. Steps 404a–446a occur in parallel with steps 404d–446d. Where steps associated with end node A are similar or identical to steps associated with end node D, the steps associated with end node D may not be described in detail. FIGS. 5A and 5B illustrates time lines showing steps 404a–446a and 404d–446d occurring in parallel.

In step 404a, LTE 110a detects that a failure has occurred in system A-D. However, LTE 110a does not isolate which link AB, BC or CD is responsible for the failure. Following detection of a system failure, in step 406a, LTE 110a performs line protect switching in an attempt to restore the system. In steps 408a, 408d a determination is made as to whether system A-D has been restored. In steps 410a, 410d if the LTEs 110a, 110d successfully restore system A-D using LPS, then there is no need to coordinate a restoration path between end node A and end node D. However, if LPS does not restore system A-D, then LTE 110a, 110d respectively inform OCCS-controllers 114a, 114d of the failure of system A-D, in steps 412a, 412d.

Continuing to step 414a, OCCS-controller 114a consults its restoration look-up table 202, discussed above, to determine whether it has a primary or secondary role in coordinating the establishment of a restoration path for system A-D. Assume that based on the second column of restoration look-up table 202, OCCS-controller 114a knows it has the "primary" role in coordinating an restoration path between end node A and end node D.

While steps 404a–414a are performed at end node A, steps 404d–414d are performed at end node D. As described above, in step 414a, OCCS-controller 114a reads restoration look-up table 202 and learns it has the "primary" role in coordinating a restoration path between end node A and end node D. Similarly, in step 414d, OCCS-controller 114d reads its copy of restoration table 202 and learns it has the "secondary" role in coordinating a restoration path between end node A and end node D. In having the primary role, OCCS-controller 114a will be the first OCCS-controller that attempts to coordinate a restoration path. In having the secondary role, OCCS-controller 114d will only attempt to coordinate a restoration path if it does not receive information identifying a restoration plan from the primary OCCS-controller 114a. Secondary OCCS-controller 114d performs a majority of the steps that are performed by primary OCCS-controller 114a. However, as will be explained below, secondary OCCS-controller 114d only sends a restoration plan to other nodes if, within a predetermined amount of time, secondary OCCS-controller 114d did not receive information identifying a restoration plan from primary OCCS-controller 114a. This parallel determination of restoration plans by both the primary and secondary OCCS-controllers 114a, 114d, provides redundancy and thereby increases the speed in which a restoration path will be established. This redundancy also increases the probability that a restoration path will be established between end nodes A and D.

Returning to the explanation of the control flow diagram in FIGS. 4A–4D, after OCCS-controller 114a is notified by LTE 110a that a failure has occurred in system A-D, OCCS-controller 114a communicates with the line elements (not shown) and other OCCS-controllers, in step 418a, to isolate the location of the failure. At the same time a path-default-hold-off timer begins in step 416a. The path-default-hold-off timer expires, after a predetermined amount of time, in step 420a. Following expiration of the timer, in step 422a, a determination is made of whether OCCS-controller 114a, through its communications with line elements and other OCCS-controllers, has isolated the location of the failure. The location of the failure refers to which link within a path supporting the system is responsible for the failure of the system.

If OCCS-controller 114a has isolated the location of the failure, then in step 426a, OCCS-controller 114a reads restoration look-up table 202 to determine a failure location dependent restoration plan. If OCCS-controller 114a has not isolated the location of the failure, then in step 424a, OCCS-controller 114a reads restoration look-up table 202 to determine a default restoration plan. In one example, the default restoration plan is based on which link was most likely to have failed. For example, the likelihood that a link has failed can be determined using simulations and performance statistics.

In step 428a, once a restoration plan is determined, the function of OCCS-controller 114a depends on whether it has the primary or the secondary role in coordinating a restoration path. In this example, OCCS-controller 114a has the primary role. Therefore, OCCS-controller 114a initiates a restoration plan in step 432a OCCS-controller 114a sends information regarding the restoration plan to OCCS-controllers in those nodes whose cooperation is required to establish a restoration path between end node A and end node D. OCCS-controller 114a can broadcast the information to OCCS-controllers in all the other nodes of network 100 or can send the information to select nodes identified based on the particular restoration plan chosen.

Each node E-H also has a control link (not shown) coupled to DCN/OSS 109. The information regarding the restoration plan is sent between nodes via DCN/OSS 109. In the preferred embodiment, the only information sent from the primary OCCS-controller to the other OCCS-controllers, including the secondary OCCS controller, is the identity of system, the location of the failure (or the default location of the failure) within the path supporting the system, and identity of a plan (i.e. 1, 2 or 3). Using their restoration look-up tables, each OCCS-controller knows (through a simple table-look-up) whether it needs to send switch commands to the OCCS it controls, based on this information.

In one alternative embodiment, only one plan exists for each link failure. In this embodiment, only information identifying the system and the location of the failure (which link) is needed to identify a restoration plan.

Once OCCS-controllers receive the information identifying a restoration plan, OCCSs are switched accordingly to effect a restoration path. For example, if OCCS-controller 114a has determined that the failure has occurred in link BC of path A-B-C-D supporting system A-D, then OCCS-controller 114a sends this information, and a plan number, to the other OCCS-controllers via DCN/OSS 109. Looking at restoration look-up table 202, plan 1, 2, or 3 can be used to restore a path between end node A and end node D. For purpose of example: plan 1 may involve rerouting traffic between end nodes A and D via a path A-B-F-G-C-D including links AB, BF, FG, GC, and CD; plan 2 may involve rerouting traffic via a path A-E-F-G-H-D including links AE, EF, FG, GH, and HD; and plan 3 may involve rerouting traffic via a path A-E-F-G-C-D including links AE, EF, FG, GC and CD.

The restoration plan selection process involves communications from the primary and secondary OCCS controllers and OSS/DCN 109. These communications take place immediately after the failure is detected and isolated to its failed link. The process of selecting a restoration plan is controlled by the OCCS-controller. The restoration look-up table for the failed system is referenced by the primary and secondary OCCS-controllers to determine which plan is its first choice. For example, the plans in order of preference can be plan 1, plan 2, then plan 3. Once a plan is determined, the OCCS-controllers communicate with DCN/OSS 109 to verify that this route is available and in a good working status at the time. DCN/OSS 109 will respond to each request by an OCCS-controller for each unique restoration plan. The OCCS-controllers make the final determination of which plan to use based on feedback from DCN/OSS 109.

Assuming that plan 1 is chosen, and involves rerouting traffic between end nodes A and D such that the traffic travels via path A-B-F-G-C-D including links AB, BF, FG, GC, and CD then the OCCS-controllers of nodes A, B, F, G, C, and D need information identifying which restoration plan to use. Thus, in step 432a primary OCCS-controller 114a of end node A sends information identifying the location of the failure (i.e, system A-D, link BC) and plan number (i.e., plan 1) to nodes B, F, G, C and D, via DCN/OSS 109. Once the OCCS-controllers of nodes B, F, G, C and D receive the failure information, they consult their restoration look-up tables to learn the required connections commands to sent to the OCCS they control, and accordingly switch their respective OCCSs to effect a restoration path between end node A and end node D.

Once an OCCS-controller has initiated and established a restoration path, the OCCS controller informs the DCN/OSS 109 of which restoration route has been chosen and is in use. The OCCS-controllers also inform DCN/OSS 109 of a current status of idle restoration routes. This status is obtained from network elements that constantly monitor the routes and instantaneously inform their local OCCS-controller of any faults that have occurred. Status messages informing local OCCS-controllers of corrected faults are also communicated to DCN/OSS 109. Additionally, once a failed system has been repaired, and a restoration path is no longer utilized, the primary and secondary OCCS-controllers associated with that system inform DCN/OSS 109 that the restoration routes are available once again to any OCCS-controller.

Advantages exist for sending only failure location data (e.g., the identity of the system, and failed link) and a plan number between OCCS-controllers rather than specific switching instruction data. An advantage includes minimizing data traffic. Another advantage is reducing the time needed for communications and thus the time for restoration. Also, by reducing the number of bits transmitted the chance of a communications error is reduced.

OCCS-controller 114d independently determines a "secondary" restoration plan in steps 412b–426d. In the preferred embodiment the "primary" and the "secondary" restoration plans are identical. In step 430d a secondary-hold-off-timer begins. After expiration of the timer in step 436d, OCCS-controller 114d either performs step 440d or 444d, depending on whether information was received from OCCS-controller 114a regarding a restoration plan. In step 438d, a determination is made whether OCCS-controller 114d has received information from the primary OCCS-controller (114a in this example) for coordination a restoration path. If OCCS-controller 114d has received information regarding a restoration plan, then in step 444d OCCS-controller 114d switches OCCS 112d to effect a restoration path between end node A and end node D, based on the information received from primary OCCS-controller 114a.

If secondary OCCS-controller 114d does not receive this information from primary OCCS-controller 114a, prior to expiration of the secondary-hold-offtimer in step 436d, then the secondary OCCS-controller 114d assumes that the OCCS-controllers in the other nodes of network 100 have also not received the information. If this occurs, then in step 440d, secondary OCCS-controller 114d sends the information to the other nodes of network 100 (including nodes B, F, G, C, and A) to initiate the secondary restoration plan determined in steps 412d–426d. Thus, secondary OCCS-controller 114b acts as a backup to primary OCCS-controller 114a in effecting a restoration path.

FIGS. 5A and 5B are time lines that illustrate how steps 404a–446a and 404d–446d occur in parallel. These time lines show how steps associated with end node A, and end node D occur in parallel. The time lines also show the relative order of steps with respect to one another. For purposes of these figures, node A is designated the primary node and node D the secondary node. These figures are not meant to show the exact points in time which events occur. These figures are only for the purpose of showing that certain steps occur prior to others and that steps are occurring at end node A and end node D during the same time period, thus in parallel. It would be obvious to one skilled in the art that the order of certain steps can be changed without effecting the apparatus and method of this invention.

As discussed above, in step 438b a determination is made whether secondary OCCS-controller 114b has received information from primary OCCS-controller 114a for coordination a restoration path. As shown in FIG. 5A, if the result of step 438d is YES, then secondary OCCS-controller 114d follows the instructions received from primary OCCS-controller 114a, in step 444d, in switching OCCS 112d to effect the restoration path.

FIG. 5B shows that when the result of step 438d is NO, secondary OCCS-controller 114d sends information to other OCCS-controllers, in step 440d, to coordinate a restoration path. In step 442d, secondary OCCS-controller 114d switches OCCS 112d based on its independently determined secondary restoration plan, to coordinate a restoration path. This secondary restoration plan can be a default plan, as shown in step 424d, if secondary OCCS-controller 114d did not isolate the location of the failure prior to expiration of the path-default-hold off-timer in step 420d.

In the present invention, a primary and a secondary OCCS-controller independently determine a restoration plan. If the secondary OCCS-controller does not receive information identifying a restoration plan within a predetermined amount of time, the secondary OCCS-controller assumes responsibility for coordinating a restoration path. By having this redundancy, the likelihood that a restoration path can be established is increased. The redundancy also increases the speed in which a restoration path can be established. Additionally, use of the path-default-hold-offtimer ensures that a restoration plan will be determined, if a failure is not isolated within an acceptable amount of time.

A network contains multiple systems, i.e. multiple pairs of LTEs. In the present invention, each system's restoration is independent of the restoration of other systems. This provides the ability to handle staggered fiber cable cuts without withholding restoration to any one or group of systems. Each system is supported by paths which are made up of links. The links include fiber cables. Each fiber cable can be supporting many systems. Typically, when a fiber cable supporting many systems is cut or torn apart, not all systems supported by the fiber cable necessarily fail at the same time. Because it is often essential to restore a system in less than 1/10 of a second, it is important to not have to wait until all systems to go down before the systems are restored together. By performing restoration on a system basis, the systems can be restored as they fail. More specifically, by having each system independently perform its own restoration procedures, multiple systems within a network can simultaneously be restored.

Features of the present invention can be implemented using hardware, software or a combination thereof and can be implemented in a computer system or other processing system. More particularly, OCCS-controllers 114*a*, 114*d* can be implemented in a computer system, in one or more processor chips, or other processing system. For example, steps 404*a*–444*a* and 404*b*–444*b* can be carried out primarily in software. More specifically, computer readable program code can enable computer systems to perform steps 404*a*–444*a* and 404*b*–444*b*.

Figure 6:
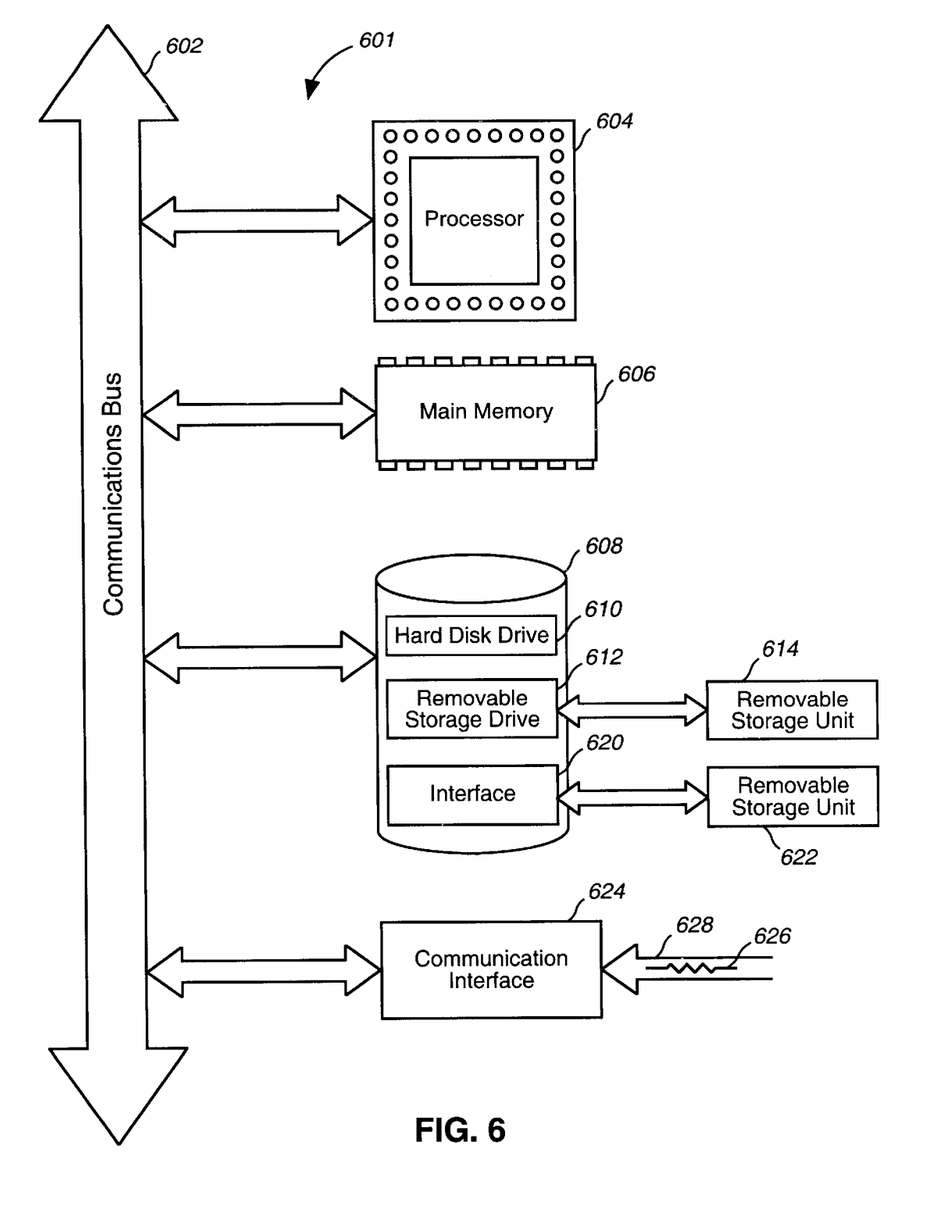
FIG. 6 shows a computer system that can be used to implement features of the present invention.

Referring to FIG. 6, a block diagram illustrates a computer system that can be used to implement features of the present invention. Various software embodiments are described in terms of this example computer system. After reading this description, it will be apparent to a person skilled in the relevant art how to implement the invention using other computer systems and/or computer architectures.

In FIG. 6, a computer system 601 includes one or more processors, such as processor 604. Processor 604 is connected to a communication bus 602. Computer system 601 includes a main memory 606, preferably random access memory (RAM), and can also include a secondary memory 608. Secondary memory 608 can include, for example, a hard disk drive 610 and/or a removable storage drive 612, representing a floppy disk drive, a magnetic tape drive, an optical disk drive, etc. Removable storage drive 612 reads from and/or writes to a removable storage unit 614 in a well known manner. Removable storage unit 614, represents a floppy disk, magnetic tape, optical disk, etc. which is read by and written to by removable storage drive 612. Removable storage unit 614 includes a computer usable storage medium having stored therein computer software and/or data.

In alternative embodiments, secondary memory 608 can include other similar means for allowing computer programs or other instructions to be loaded into computer system 601. Such means can include, for example, a removable storage unit 622 and an interface 620. Examples of such can include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 601.

Computer system 601 can also include a communications interface 624. Communications interface 624 allows software and data to be transferred between computer system 601 and external devices. Examples of communications interface 624 include, but are not limited to a modem, a network interface (such as an Ethernet card), a communications port, a PCMCIA slot and card, etc. Software and data transferred via communications interface 624 are in the form of signals which can be electronic, electromagnetic, optical or other signals capable of being received by communications interface 624. These signals 626 are provided to communications interface via a channel 628. Channel 628 carries signals 626 and can be implemented using wire or cable, fiber optics, a phone line, a cellular phone link, an RF link and other communications channels.

In this document, the terms "computer program medium" and "computer usable medium" are used to generally refer to media such as removable storage device 612, a hard disk installed in hard disk drive 610, and signals 626. Computer program products are means for providing software to computer system 601.

Computer programs (also called computer control logic) are stored in main memory and/or secondary memory 608. Computer programs can also be received via communications interface 624. Such computer programs, when executed, enable the computer system 601 to perform the features of the present invention as discussed herein. In particular, the computer programs, when executed, enable the processor 604 to perform the features of the present invention. Accordingly, such computer programs represent controllers of the computer system 601.

In an embodiment where the invention is implemented using software, the software can be stored in a computer program product and loaded into computer system 601 using removable storage drive 612, hard drive 610 or communications interface 624. The control logic (software), when executed by the processor 604, causes the processor 604 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

CONCLUSION

While various embodiments of the present invention have been described above, it should be understood that they have been presented by way of example only, and not limitation.

It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. In an optical communications network having a system including a first light termination element (LTE) and a second LTE, a first optical switching unit (OSU) coupled to the first LTE of the system, a second OSU coupled to the second LTE of the system, the first OSU coupled to the second OSU by a path, whereby optical data traffic can be transmitted between the first OSU and the second OSU via the path, a method for providing a restoration path between the first OSU and the second OSU upon detection of a failure of the system, comprising the steps of:

(a) notifying the first OSU and second OSU of the failure;

(b) assigning a primary role to one of the first and second OSUs, and assigning a secondary role to the other one of the rest and second OSUs;

(c) determining a primary restoration plan, said determining step comprising said primary OSU communicating with a central network management center to verify that a particular restoration path, for use in said primary restoration plan, is available and in good working status; and (d) sending information identifying said primary restoration plan from the primary OSU for effecting the restoration path and restoring the system.

2. The method of claim 1, wherein step (c) further comprises the steps of:

(c1) determining a location within the path responsible for the failure of the system; and (c2) determining said primary restoration plan based upon the result of step (c1).

3. The method of claim 1, wherein said primary restoration plan of step (c) is selected from a plurality of possible plans by said primary OSU based on a communication between said primary OSU and a central network management center.

4. The method of claim 1, wherein said information sent from said primary OSU in step (d) is sent to other OSUs in the optical communications network including said second OSU.

5. An apparatus for configuring a restoration path in an optical network, comprising:

a system including a first light termination element (LTE) and a second LTE;

a primary optical switching unit (OSU) optically coupled to said first LTE;

a secondary OSU optically coupled to said second LTE;

said primary OSU optically coupled to said secondary OSU via a path, wherein said primary OSU includes:

a primary notification module for receiving a notification of a failure of said system;

a primary restoration path determination module for determining a primary restoration plan in response to said primary notification module receiving said notification of a failure, wherein said primary OSU communicates with a central network management center to verify that a particular restoration path, for use in said primary restoration plan, is available and in good working status; and a primary sending module for sending information identifying said primary restoration plan from said primary OSU to configure a restoration path between said primary OSU and said secondary OSU in order to restore said system.

6. The apparatus according to claim 5, wherein said secondary OSU comprises:

a secondary notification module for receiving a notification of a failure of said system;

a secondary restoration path determination module for determining a secondary restoration plan in response to said secondary notification module receiving said notification of a failure;

a secondary-hold-offtimer for measuring a predetermined amount of time; and a secondary sending module for sending further information identifying said secondary restoration plan, when said secondary-hold-off timer expires prior to said secondary OSU receiving said information identifying said primary restoration plan from said primary sending module, to effect the restoration path between said primary OSU and said secondary OSU in order to restore said system.

7. In an optical network, a system including a first LTE and a second LTE, a primary optical switching unit (OSU) optically coupled to the first LTE, a secondary OSU optically coupled to the second LTE, and the primary OSU optically coupled to the secondary OSU via a path, the primary OSU comprising:

a primary notification module for receiving a notification of a failure of the system;

a primary restoration path determination module for determining a primary restoration plan in response to said primary notification module receiving said notification of the failure, wherein said primary OSU communicates with a central network management center to verify that a particular restoration path, for use in said primary restoration plan, is available and in good working status; and a primary sending module for sending information identifying said primary restoration plan from the primary OSU in order to configure a restoration path between the primary OSU and the secondary OSU in order to restore the system.

8. A computer program product including a computer usable medium having computer program logic recorded therein, the computer program logic comprising:

a first computer readable program code means for enabling a computer, in response to a notification of an LTE system failure, to determine whether the computer has a primary or a secondary role in restoring the failed LTE system;

a second computer readable program code means for enabling the computer to determine a primary restoration plan when the computer has said primary role in restoring the failed LTE system; and a third computer readable program code means for enabling the computer to send information identifying said primary restoration plan in order to effect a restoration path that restores the failed LTE system, when the computer has said primary role in restoring the failed LTE system, wherein the computer communicates with a central network management center to verify that a particular restoration path, for use in said primary restoration plan, is available and in good working status.

* * * * *